United States Patent
Zhang et al.

(10) Patent No.: US 8,286,077 B2
(45) Date of Patent: Oct. 9, 2012

(54) REMOTE BATCH EDITING OF FORMATTED TEXT VIA AN HTML EDITOR

(75) Inventors: Dachuan Zhang, Sunnyvale, CA (US); Gilberto Aristides Apodaca Aragon, Hayward, CA (US); Jeffrey Huang, Mountain View, CA (US); Melissa Kristine Hunter, San Jose, CA (US); Rebecca Meredith Loew, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 12/630,133

(22) Filed: Dec. 3, 2009

(65) Prior Publication Data

US 2011/0138268 A1    Jun. 9, 2011

(51) Int. Cl.
*G06F 17/00* (2006.01)

(52) U.S. Cl. ........ 715/255; 715/229; 715/234; 715/239; 715/249

(58) Field of Classification Search .................. 715/229, 715/234, 239, 249, 255
See application file for complete search history.

(56) References Cited

U.S. PATENT DOCUMENTS

| | | | | |
|---|---|---|---|---|
| 6,973,618 B2 | 12/2005 | Shaughnessy et al. | ....... | 715/239 |
| 7,124,356 B1 * | 10/2006 | Alsafadi et al. | ............... | 715/239 |
| 7,200,668 B2 * | 4/2007 | Mak et al. | ...................... | 709/230 |
| 7,398,464 B1 | 7/2008 | Wei et al. | ....................... | 715/239 |
| 7,472,343 B2 * | 12/2008 | Vasey | ............................. | 715/234 |
| 7,478,170 B2 | 1/2009 | Ong et al. | ...................... | 709/246 |
| 7,512,878 B2 | 3/2009 | Shur et al. | ...................... | 715/234 |
| 7,546,527 B2 | 6/2009 | Dames et al. | .................... | 715/239 |
| 7,594,163 B2 * | 9/2009 | Slack-Smith | ................. | 715/200 |
| 7,886,225 B2 * | 2/2011 | Cope | .............................. | 715/239 |
| 8,028,229 B2 * | 9/2011 | Bailor et al. | ................... | 715/255 |
| 2002/0178290 A1 | 11/2002 | Coulthard et al. | | |
| 2002/0184264 A1 * | 12/2002 | Berg et al. | ...................... | 707/513 |
| 2003/0037303 A1 | 2/2003 | Bodlaender et al. | | |
| 2004/0068505 A1 * | 4/2004 | Lee et al. | ....................... | 707/100 |
| 2004/0107224 A1 * | 6/2004 | Bera | .............................. | 707/203 |
| 2004/0181750 A1 * | 9/2004 | Lection et al. | ................. | 715/513 |
| 2004/0225658 A1 | 11/2004 | Horber | ............................... | 707/9 |
| 2006/0106822 A1 | 5/2006 | Lee et al. | ....................... | 707/100 |
| 2006/0136353 A1 | 6/2006 | Crockett et al. | | |
| 2006/0259524 A1 * | 11/2006 | Horton | .......................... | 707/201 |
| 2006/0271848 A1 * | 11/2006 | Morford et al. | ............... | 715/523 |
| 2006/0277452 A1 | 12/2006 | Villaron et al. | ................ | 715/207 |

(Continued)

OTHER PUBLICATIONS

International Search Report and Written Opinion in Application PCT/US2011/023599 dated Aug. 3, 2011 (8 pages).

(Continued)

*Primary Examiner* — Stephen S. Hong
*Assistant Examiner* — Matthew Ludwig
(74) *Attorney, Agent, or Firm* — Merchant & Gould P.C.

(57) ABSTRACT

Remote batch editing of formatted text may be provided. A request to edit a source document comprising text using a first markup language may be received. The source document may be converted to a second markup language and provided to the requestor. Changes to the converted document may be received and edit commands may be generated for those changes. The edit commands may then be applied to the source document.

1 Claim, 5 Drawing Sheets

U.S. PATENT DOCUMENTS

| | | | |
|---|---|---|---|
| 2007/0118598 A1* | 5/2007 | Bedi et al. | 709/204 |
| 2008/0059539 A1* | 3/2008 | Chin et al. | 707/203 |
| 2009/0006454 A1 | 1/2009 | Zarzar et al. | 707/102 |
| 2009/0006936 A1* | 1/2009 | Parker et al. | 715/200 |
| 2009/0193331 A1* | 7/2009 | Croft et al. | 715/255 |
| 2009/0234823 A1 | 9/2009 | Wong | 707/4 |
| 2009/0327873 A1* | 12/2009 | Cairns | 715/249 |

OTHER PUBLICATIONS

Martin, et al.; "*XML-bases text & graphics integration*"; Regulations Worldwide online at the Siemens Public Communication Networks Group: SGML Editorial System for Providing Company-internal Regulations in the Intranet.GCA SGML/XML Europe '98 Paris; 1998; 10 pgs.

* cited by examiner

REMOTE BATCH EDITING OF FORMATTED TEXT VIA AN HTML EDITOR

BACKGROUND

Remote batch editing is a process for modifying formatted text in an HTML editor. In some situations, applications may use a high-level language to describe text formatting in a document. For example, Office Open XML (OOXML) is a file format for representing spreadsheets, charts, presentations and word processing documents. A markup language, such as DrawML and/or MathML, used in the file may be identified by an XML schema and may support rich text formatting such as revision markings, footnotes, comments, images, animations, graphical renderings, and elaborate formatting and styles. The conventional strategy for editing rich text formatted documents is often to use an application with native support for the markup language. This often causes problems, however, because the conventional strategy does not allow users to make use of their own preferred and/or readily available applications. For example, the PowerPoint® presentation application may use OOXML/DrawML text, but a user may wish to remotely edit a presentation document through a web browser. The editing of the file may need to be handled in HTML by an editor that may be unaware of the rich text formatting that may be applied to the text.

SUMMARY

Remote batch editing of formatted text may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Remote batch editing of formatted text may be provided. A request to edit a source document comprising text using a first markup language may be received. The source document may be converted to a second markup language and provided to the requestor. Changes to the converted document may be received and edit commands may be generated for those changes. The edit commands may then be applied to the source document.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
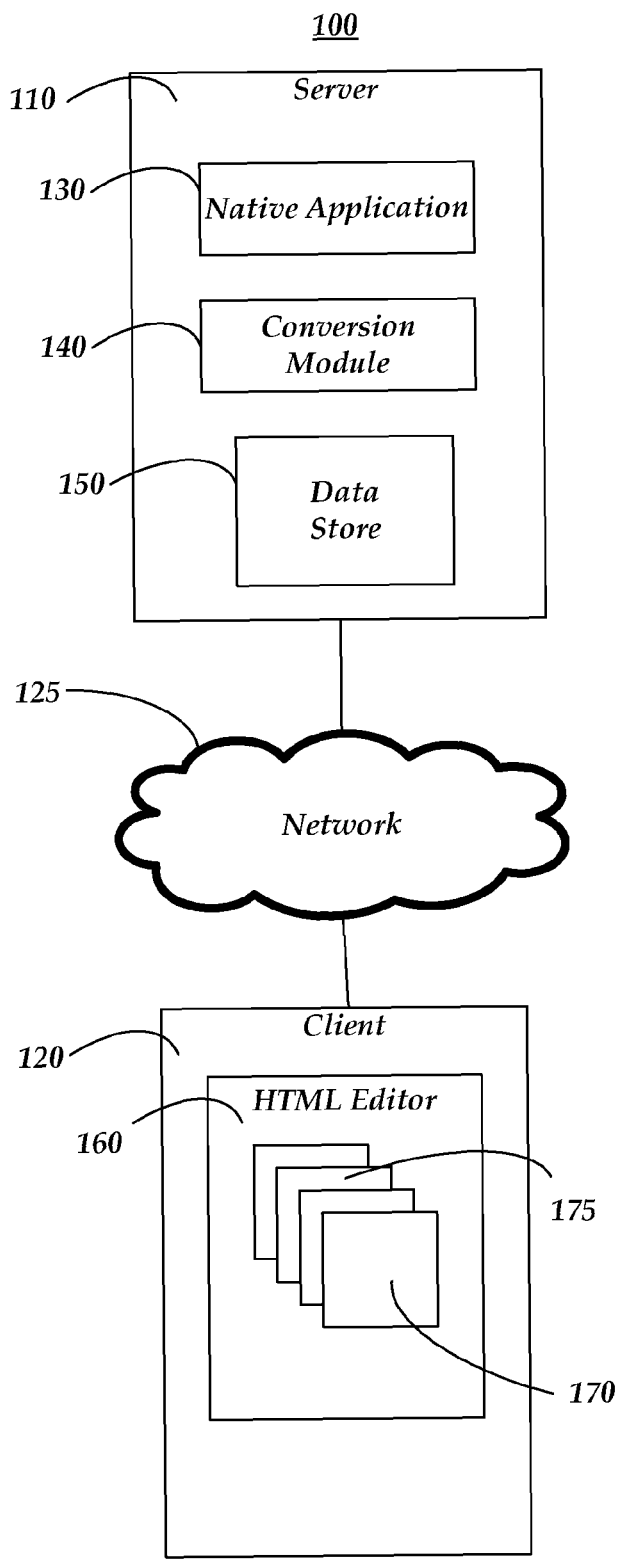
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Remote batch editing of formatted text may be provided. Consistent with embodiments of the present invention, text formatted using a high-level markup language may be converted to HTML and back again while retaining both original formatting unsupported by HTML and edits the user makes via an HTML text editor. The original text may be converted to HTML and edited by a user. Both the edited and original HTML may be converted back to the high-level markup language and compared to generate a list of changes. The change list may be used to develop a list of edits that may be needed to convert the original formatted text into the edited version, and the list of edits may be applied to the original text.

FIG. 1 is a block diagram of an operating environment 100. Operating environment 100 may comprise a server 110 and a client 120. Server 110 and client 120 may each comprise a computing device 400 as described below in greater detail with respect to FIG. 4 and may be connected via a network 125 such as an intranet and/or the Internet. Server 110 may comprise a native application 130 for creating, managing, and/or editing rich text-formatted documents, such as a presentation application. Server 110 may further comprise a conversion module 140 and a data store 150. Conversion module 140 may comprise an application and/or utility program operative to convert a document between a high-level markup language such as OOXML and HTML. Native application 130 and/or conversion module 140 may be coupled to data store 150 and may be used to store a document before, during, and/or after conversion. Client 120 may comprise an HTML editor 160 operative to allow a user to edit an HTML document 170. Changes and revisions made to HTML document 170 may be stored as a plurality of previous document versions 175.

Figure 2:
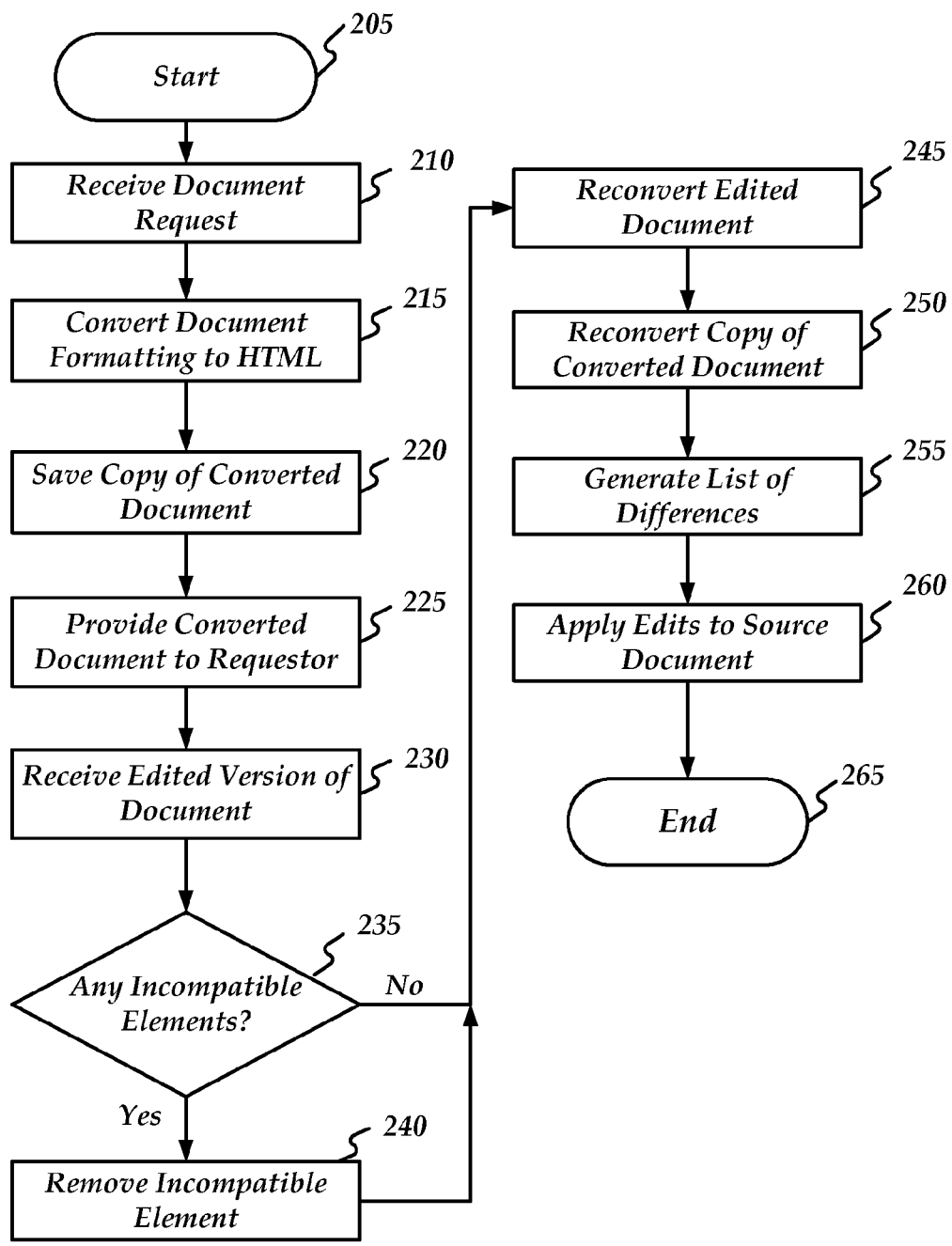
FIG. 2 is a flow chart of a method for providing remote batch editing.

FIG. 2 is a flow chart setting forth the general stages involved in a method 200 consistent with an embodiment of the invention for providing remote batch editing of rich-formatted text. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may request access to a rich text-formatted document. For example, client 120 may request access to a presentation document comprising the Open Office XML (OOXML) format saved in data store 150. The OOXML format may support a plurality of markup languages as described in the ISO/IEC 29500:2008 (Ecma-376) standard. The markup languages may comprise, for example, WordprocessingML, SpreadsheetML, PresentationML, Office Math Markup Language, DrawML, VML, and/or XML.

From stage 210, method 200 may advance to stage 215 where computing device 400 may convert the requested document from its native markup language to a second markup language compatible with an editor associated with the requestor. For example, client 120 may request that the document be converted from OOXML to the Hypertext Markup Language (HTML) for use with HTML editor 160.

After converting the document at stage 215, method 200 may advance to stage 220 where computing device 400 may save a copy of the converted document. For example, server 110 may save a copy of the HTML-formatted document in data store 150.

Method 200 may then advance to stage 225 where computing device 400 may provide the converted document to the requestor. For example, server 110 may send a copy of the converted document over network 125 to client 120. Consistent with embodiments of the invention, the request for the document may be received from an editing application executing locally on the computer where the document is stored. The computer may convert the document to a markup language compatible with the local editing application and provide the document to the local editing application.

After providing the converted document to the requestor, method 200 may advance to stage 230 where computing device 400 may receive an edited version of the converted document. For example, a user of client 120 may use HTML editor 160 to make changes to the converted document, such as adding, modifying, and/or removing text, formatting, and/or objects. These changes may be stored in the document using HTML formatting and the edited version of the document may be sent back to server 110.

Method 200 may then advance to stage 235 where computing device 400 may determine whether the edited version of the document comprises any HTML formatted elements that may be incompatible with the native markup language (e.g., OOXML). Consistent with embodiments of the invention, stage 235 may be performed by server 110 after receipt of the edited version of the document and/or client 120 before sending the edited version of the document to server 110.

If any elements are determined to be incompatible at stage 235, method 200 may advance to stage 240 where computing device 400 may remove the incompatible element(s). For example, the element itself may be removed from the document, the incompatible formatting may be removed, leaving the element (and any compatible formatting) in place, and/or the formatting or element may be commented out.

After removing the incompatible element(s) at stage 240, or if no incompatible elements are identified at stage 235, method 200 may advance to stage 245 where computing device 400 may reconvert the edited version of the document to the native markup language. For example, server 110 may step through each element of the document and replace the HTML formatting with equivalent formatting compatible with OOXML. Method 200 may then advance to stage 250 where computing device 400 may similarly reconvert the copy of the converted document saved at stage 220.

After reconverting the saved copy of the document at stage 250, method 200 may advance to stage 255 where computing device 400 may generate a list of differences between the reconverted documents. For example, server 110 may provide the reconverted edited version document and the reconverted version of the source document to a diffing module that may produce a list of differences between the two documents. For example, the changed version of the document may comprise a page header in a modified font and text modified into a column-layout format. The diffing module may produce a list comprising these two changes.

After generating the list of differences at stage 255, method 200 may advance to stage 260 where computing device 400 may apply edits to the source document based on the change list generated at stage 255. For example, server 110 may apply the new header font and column-layout format to the source document and save the modified source document to data store 150. Method 200 may then end at stage 265.

Figure 3A:
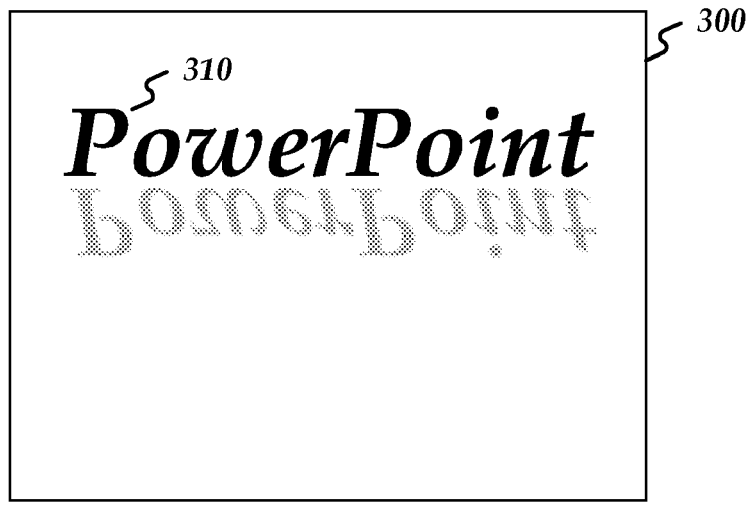
FIGS. 3A-3C are block diagrams illustrating remote editing of formatted text.

FIG. 3A comprises a block diagram illustrating a slide 300 of a presentation document comprising a text element 310. Slide 300 may comprise OOXML formatted elements such as the following excerpt in Table 1.

TABLE 1

```
<p:sld xmlns:a="http://schemas.openxmlformats.org/drawingml/2006/main"
xmlns:r="http://schemas.openxmlformats.org/officeDocument/2006/relationships"
xmlns:p="http://schemas.openxmlformats.org/presentationml/2006/main">
    <p:cSld>
        <p:spTree>
            <p:sp>
                <p:nvSpPr>
                    <p:cNvPr id="4" name="Title 3"/>
                    <p:cNvSpPr>
                        <a:spLocks noGrp="1"/>
                    </p:cNvSpPr>
                    <p:nvPr>
                        <p:ph type="ctrTitle"/>
                    </p:nvPr>
                </p:nvSpPr>
                <p:spPr/>
                <p:txBody>
                    <a:bodyPr/>
                    <a:lstStyle/>
                    <a:p>
                        <a:r>
                            <a:rPr lang="en-US" dirty="0" smtClean="0">
                                <a:effectLst>
                                    <a:reflection blurRad="6350" stA="50000" endA="300" endPos="50000" dist="29997" dir="5400000" sy="-100000" algn="bl" rotWithShape="0"/>
                                </a:effectLst>
                            </a:rPr>
                            <a:t>PowerPoint</a:t>
                        </a:r>
                        <a:endParaRPr lang="en-US" dirty="0">
                            <a:effectLst>
                                <a:reflection blurRad="6350" stA="50000" endA="300" endPos="50000" dist="29997" dir="5400000" sy="-100000" algn="bl" rotWithShape="0"/>
```

TABLE 1-continued

```
                    </a:effectLst>
                </a:endParaRPr>
            </a:p>
        </p:txBody>
    </p:sp>
</p:spTree>
<p:extLst>
    <p:ext uri="{BB962C8B-B14F-4D97-AF65-F5344CB8AC3E}">
        <p14:creationId xmlns:p14="http://schemas.microsoft.com/office/powerpoint/2010/main" val="946199914"/>
    </p:ext>
</p:extLst>
</p:cSld>
```

Figure 3B:
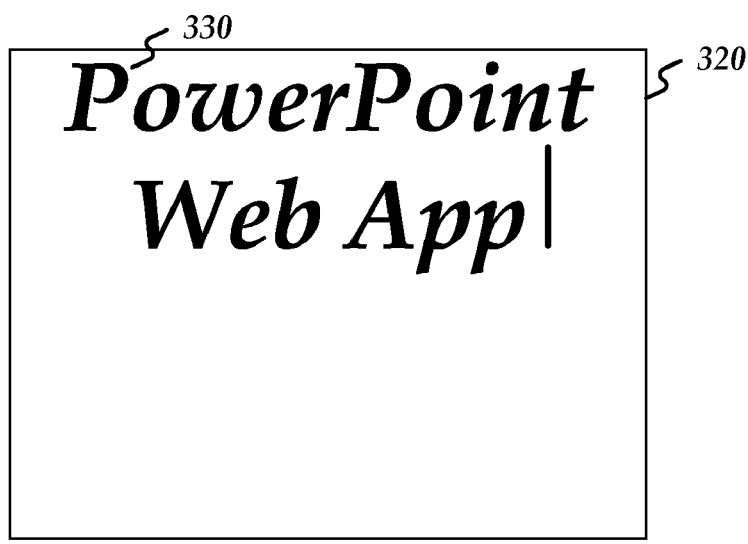

FIG. 3B comprises a block diagram illustrating slide 300 as modified into a converted HTML slide 320 during the editing process. The OOXML of slide 300 may be converted into HTML, such as that shown below in Table 2, and the client may edit the slide using an available HTML editor. For example, text 310 may be edited from "PowerPoint" to a modified text element 330 comprising the text "PowerPoint Web App".

TABLE 2

```
<div class=defaultPHStyles style='font-size:32.0px;font-family:\"Century Gothic\";color:#94C600;text-align:left'> <\/div><p class=nonListPara style='direction:ltr' lang=en-US style='language:en-US' align=left><font size=6 face=\"Century Gothic\" color=\"#94C600\">PowerPoint<\/font><\/p>
```

Figure 3C:

FIG. 3C comprises a block diagram illustrating a reconverted slide 340 comprising modified text element 330 as converted back from HTML into OOXML. The resulting OOXML may comprise, for example, that listed below in Table 3.

TABLE 3

```
<p:sld xmlns:a="http://schemas.openxmlformats.org/drawingml/2006/main"
xmlns:r="http://schemas.openxmlformats.org/officeDocument/2006/relationships"
xmlns:p="http://schemas.openxmlformats.org/presentationml/2006/main">
    <p:cSld>
        <p:spTree>
            <p:sp>
                <p:nvSpPr>
                    <p:cNvPr id="4" name="Title 3"/>
                    <p:cNvSpPr>
                        <a:spLocks noGrp="1"/>
                    </p:cNvSpPr>
                    <p:nvPr>
                        <p:ph type="ctrTitle"/>
                    </p:nvPr>
                </p:nvSpPr>
                <p:spPr/>
                <p:txBody>
                    <a:bodyPr/>
                    <a:lstStyle/>
                    <a:p>
                        <a:r>
                            <a:rPr lang="en-US" dirty="0">
                                <a:effectLst>
                                    <a:reflection blurRad="6350" stA="50000" endA="300" endPos="50000" dist="29997" dir="5400000" sy="-100000" algn="bl" rotWithShape="0"/>
                                </a:effectLst>
                            </a:rPr>
                            <a:t>PowerPoint Web App</a:t>
                        </a:r>
                    </a:p>
                </p:txBody>
            </p:sp>
        </p:spTree>
        <p:extLst>
            <p:ext uri="{BB962C8B-B14F-4D97-AF65-F5344CB8AC3E}">
                <p14:creationId xmlns:p14="http://schemas.microsoft.com/office/powerpoint/2010/main"
```

TABLE 3-continued

```
val="946199914"/>
            </p:ext>
        </p:extLst>
    </p:cSld>
    <p:clrMapOvr>
        <a:masterClrMapping/>
    </p:clrMapOvr>
    <p:timing>
        <p:tnLst>
            <p:par>
                <p:cTn id="1" dur="indefinite" restart="never" nodeType="tmRoot"/>
            </p:par>
        </p:tnLst>
    </p:timing>
</p:sld>
```

An embodiment consistent with the invention may comprise a system for providing remote editing of formatted text. The system may comprise a memory storage and a processing unit coupled to the memory storage. The processing unit may be operative to receive a request from a client to edit a source document comprising a first markup language, convert the source document to a second markup language compatible with an editor associated with the client, and send the converted document to the client.

Another embodiment consistent with the invention may comprise a system for providing remote editing of formatted text. The system may comprise a memory storage and a processing unit coupled to the memory storage. The processing unit may be operative to receive a request to edit a source document comprising a first markup language, convert the source document to a second markup language, receive at least one change to the converted document, generate at least one edit command associated with the at least one change, and apply the at least one edit command to the source document. The system may be operative to generate the edit command may be generated by reconverting the edited version of the document and comparing it to the source document and/or a converted and reconverted version of the source document.

Yet another embodiment consistent with the invention may comprise a system for providing remote editing of formatted text. The system may comprise a memory storage and a processing unit coupled to the memory storage. The processing unit may be operative to receive a request for a source document from a client, convert the formatting associated with each of the plurality of document elements from the rich text formatting markup language to Hypertext Markup Language (HTML), save a copy of the converted document, send the converted document to the client, and receive an edited version of the converted document from the client. The system may then determine whether at least one of the plurality of document elements of the edited document comprises an HTML formatting incompatible with the rich text formatting markup language, and, if so, remove the at least one of the plurality of document elements from the edited document. The system may be further operative to reconvert the formatting associated with each of the plurality of document elements from HTML in the edited document to the rich text formatting markup language, reconvert the formatting associated with each of the plurality of document elements from HTML in the copy of the converted document to the rich text formatting markup language, generate a list comprising a plurality of differences between the reconverted edited document to the copy of the converted document, and apply an editing command associated with each of the plurality of differences to the source document.

Figure 4:
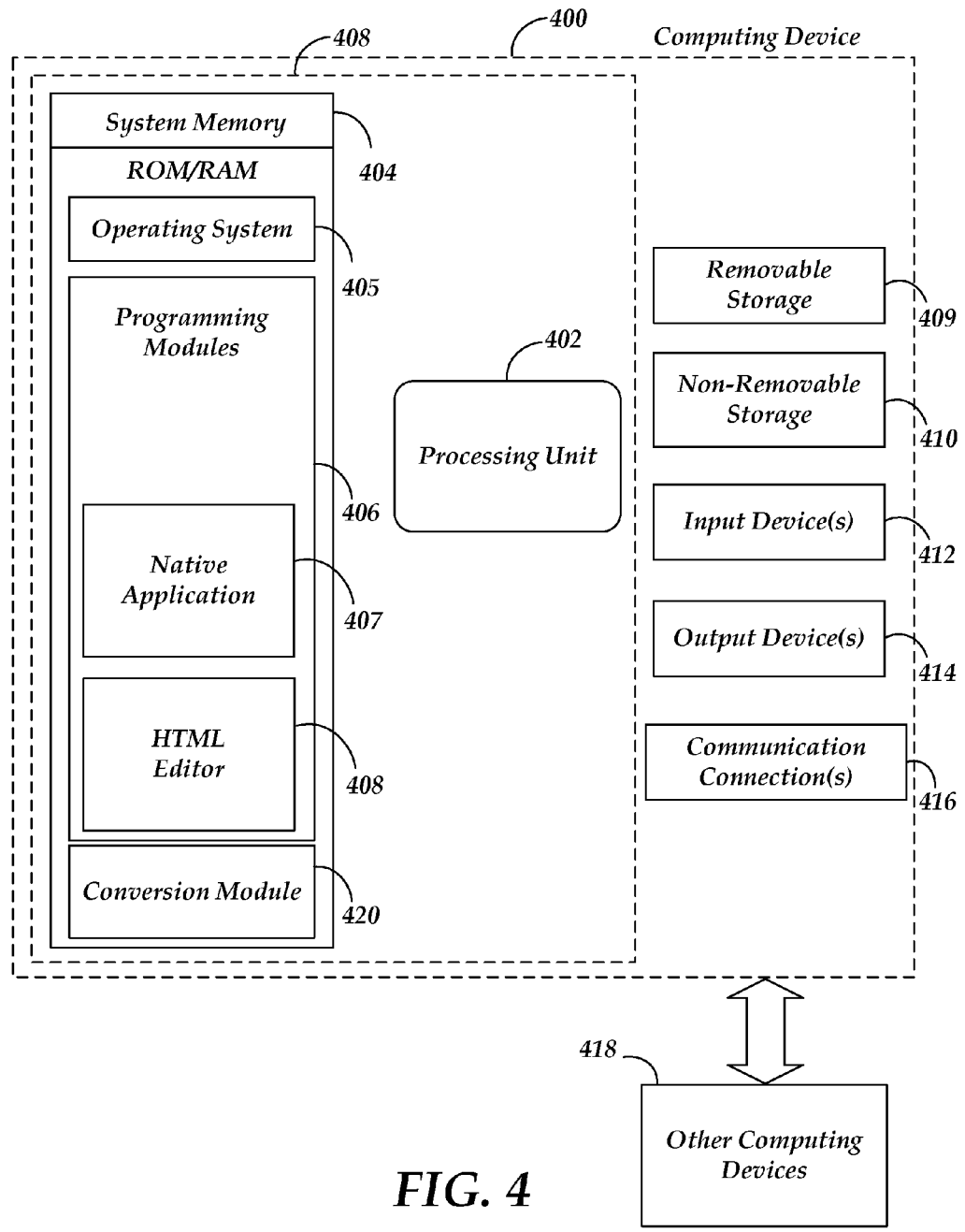
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a native application 407 and/or an HTML editor 408. Operating system 405, for example, may be suitable for controlling computing device 400's operation. In one embodiment, programming modules 406 may include a conversion module 420 operative to convert documents between different markup languages. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. conversion module 420) may perform processes including, for example, one or more of method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A system for providing remote editing of formatted text, the system comprising:
   a memory storage; and
   a processing unit coupled to the memory storage, wherein the processing unit is operative to:
      receive a request for a source document from a client, wherein the source document comprises an open-office XML document comprising a plurality of document elements formatted according to a rich text formatting markup language,
      convert the formatting associated with each of the plurality of document elements from the rich text formatting markup language to Hypertext Markup Language (HTML),
      save a copy of the converted document,
      send the converted document to the client,
      receive an edited version of the converted document from the client,
      determine whether at least one of the plurality of document elements of the edited document comprises an HTML formatting incompatible with the rich text formatting markup language,
      in response to determining that at least one of the plurality of document elements of the edited document comprises an HTML formatting incompatible with the rich text formatting markup language, remove the at least one of the plurality of document elements from the edited document,
      reconvert the formatting associated with each of the plurality of document elements from HTML in the edited document to the rich text formatting markup language,
      reconvert the formatting associated with each of the plurality of document elements from HTML in the copy of the converted document to the rich text formatting markup language,
      generate a list comprising a plurality of differences between the reconverted edited document to the reconverted copy of the converted document, and
      apply an editing command associated with each of the plurality of differences to the source document.

* * * * *